Jan. 20, 1948.  F. A. ULM  2,434,892
BAG AND COMPOSITE MATERIAL
Filed Jan. 7, 1944
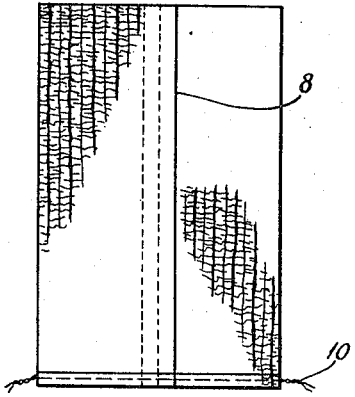
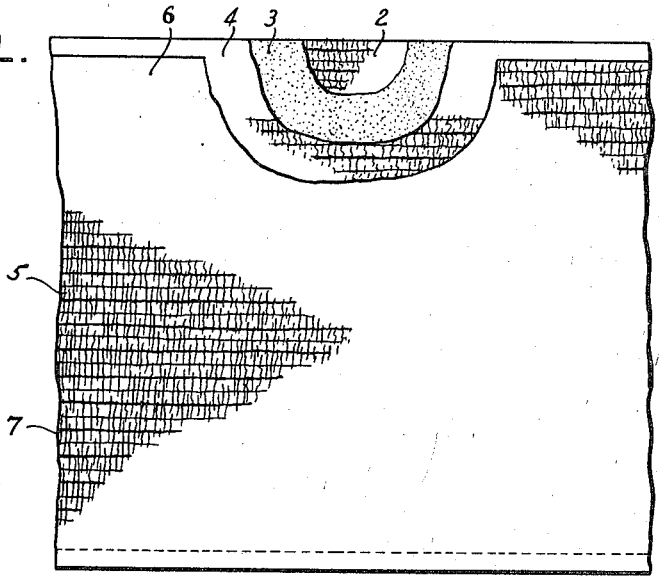
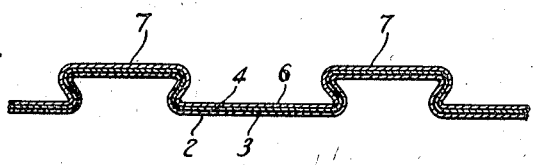
INVENTOR
Frederick A. Ulm
BY
ATTORNEYS Patented Jan. 20, 1948

2,434,892

UNITED STATES PATENT OFFICE 2,434,892

BAG AND COMPOSITE MATERIAL

Frederick A. Ulm, New York, N. Y., assignor to Arkell Safety Bag Company, New York, N. Y., a corporation of New York Application January 7, 1944, Serial No. 517,340

2 Claims. (Cl. 154—46)

The present invention relates to paper bags and to composite material which may be used for bags or for wrapping purposes, and has for its object to provide novel and improved paper bags and composite material of this character.

The invention is illustrated, by way of example, in the accompanying drawings, in which:

Figure 1 is a side elevation of the bag or liner in its preferred form;

Fig. 2 is a plan view, with parts broken away, of my improved composite material in its preferred form; and Fig. 3 is a sectional view, on a greatly enlarged scale, of the composite mark.

My improved composite material as illustrated in the drawing comprises three layers or plies 2, 4 and 6, of paper arranged in superposed relation. The plies 2 and 4 are secured together to form a sheet or web by means of a waterproof adhesive 3, such as a suitable asphaltic adhesive preferably containing a suitable filler or plasticizer.

The three plies 2, 4 and 6 are crinkled and corrugated together to provide for stretchability of the composite material in transverse directions, the crinkles being shown at 5 and the corrugations at 7. The corrugating of the composite material may be performed by means of the machine of the patent to McBean No. 2,124,582, dated July 26, 1938. That machine is capable of forming closely spaced corrugations longitudinally of a web, the corrugations being flattened so as to cause them to be of more or less dovetail form in cross-section as indicated in Fig. 3.

Owing to this dove-tail formation of the corrugations, the nested corrugations in the two sheets tend to hold the sheets together in close contact and even though parts of the two sheets do become separated while in use, the corrugations and crinkles readily resume their nested relationship when the separated parts of the sheets are again brought together.

In using the composite material for wrapping purposes, the material should be arranged with the single ply 6 on the inside. This ply serves to effectively protect the contents of the bag from the asphaltic adhesive of the outer two-ply sheet. Also, by thus loosely and non-adhesively attaching the inner sheet, a uniform dead air space is provided between the two sheets which serves to assist in cushioning any bursting strain applied to the material, and also enchances the heat insulating properties of the material. It will also be noted that the crinkling and corrugating of the three sheets together insure making them of the same stretchability in both directions and thus they uniformly resist bursting strains. The material is extremely pliable and is easily handled in using it for wrapping purposes.

In constructing the bag (Fig. 1) of the composite material, the sheets or webs from which the material is formed are preferably positioned in overlapping relation, as shown in Fig. 2. The material is made into a tube with the edges brought together and adhesively secured to form the overlapping seam 8. One end of the tube may be folded over and secured by a line of stitches 10 to close the bottom of the bag.

It will be apparent that with bags made of the improved composite material, the inner sheet effectively protects the contents of the bag from coming in contact with the waterproofed duplex outer sheet. Also, the inner sheet, due to its arrangement in relation to the outer sheet, effectively serves as a cushion to resist bursting strains placed on the bag, and all three plies effectively resist such bursting strains both longitudinally and circumferentially of the bag. Owing to the pliability of the material and its ease of handling, the bag either before or after filling may be readily inserted in a cloth bag or other container, so as to serve as a liner therefor.

As will be evident to those skilled in the art, my invention permits various modifications without departing from the spirit thereof or the scope of the appended claims.

What I claim is:

1. A bag made of composite material of the class described comprising a plurality of sheets of paper arranged in superposed relation and crinkled and corrugated in directions transverse to each other with the crinkles and corrugations of the two sheets arranged in nested relation, the corrugations being flattened so as to cause them to be generally of dove-tail form in cross-section, at least the outer sheet being made of a plurality of plies secured together by means of a waterproof adhesive, the two sheets being secured together substantially solely by the nesting of their crinkles and corrugations.

2. Composite material of the class described comprising a paper web consisting of a plurality of plies of paper secured together by means of a waterproofing adhesive, and a second web of paper arranged in superposed relation to the first web, said webs being crinkled transversely to provide for longitudinal stretchability and corrugated longitudinally to provide for transverse stretchability, the corrugations being flattened so as to cause them to be generally of dove-tail form in cross-section, the webs being thus crinkled and corrugated together so as to cause the crinkles and corrugations in the two webs to be arranged in nested relation, and the webs being secured together substantially solely by the nesting of the crinkles and corrugations.

FREDERICK A. ULM.

REFERENCES CITED

The following references are of record in the file of this patent:

UNITED STATES PATENTS

| Number | Name | Date |
|---|---|---|
| 1,301,605 | Ringel | Apr. 22, 1919 |
| 1,534,482 | Angier | Apr. 21, 1925 |